United States Patent
Jackson et al.

(10) Patent No.: US 10,079,757 B2
(45) Date of Patent: Sep. 18, 2018

(54) SYSTEMS AND METHODS FOR ON-BOARD ACCESS CONTROL

(71) Applicant: GOGO LLC, Chicago, IL (US)

(72) Inventors: Mark Jackson, Broomfield, CO (US); Christopher M. Rippe, Broomfield, CO (US); Michael Metz, Glenview, IL (US)

(73) Assignee: GOGO LLC, Chicago, IL (US)

( * ) Notice: Subject to any disclaimer, the term of this patent is extended or adjusted under 35 U.S.C. 154(b) by 148 days.

(21) Appl. No.: 15/092,844

(22) Filed: Apr. 7, 2016

(65) Prior Publication Data
US 2017/0295094 A1 Oct. 12, 2017

(51) Int. Cl.
G06F 15/173 (2006.01)
H04L 12/721 (2013.01)
H04L 29/06 (2006.01)
H04L 29/12 (2006.01)

(52) U.S. Cl.
CPC ............ H04L 45/70 (2013.01); H04L 61/609 (2013.01); H04L 67/42 (2013.01)

(58) Field of Classification Search
CPC ........ H04L 45/70; H04L 61/609; H04L 67/42
See application file for complete search history.

(56) References Cited

U.S. PATENT DOCUMENTS

| | | | |
|---|---|---|---|
| 7,181,620 B1 | 2/2007 | Hur | |
| 7,188,253 B2 | 3/2007 | Halasz et al. | |
| 7,350,076 B1 | 3/2008 | Young et al. | |
| 7,363,355 B2 | 4/2008 | Knauerhase et al. | |
| 7,444,411 B2 | 10/2008 | Sung et al. | |
| 7,480,933 B2 | 1/2009 | Bush et al. | |
| 7,860,486 B2 | 12/2010 | Frank et al. | |
| 8,099,107 B2 | 1/2012 | Thomson et al. | |
| 8,190,911 B2 | 5/2012 | Chopart | |
| 8,510,801 B2 | 8/2013 | Majmundar et al. | |
| 8,577,914 B2 | 11/2013 | Hossain et al. | |
| 8,621,598 B2 | 12/2013 | Lai et al. | |

(Continued)

FOREIGN PATENT DOCUMENTS

EP 1519604 A1 3/2005

*Primary Examiner* — Jonathan A Bui
(74) *Attorney, Agent, or Firm* — Marshall, Gerstein & Borun LLP; Randall G. Rueth

(57) ABSTRACT

Techniques for providing access control in environments that may become disconnected, as a whole, from other networks (e.g., on-board a vehicle) may include locally storing access control information within the dis-connectable environment, and locally providing discovery and authentication/authorization services. Local services and/or applications may be registered and authenticated and client applications may be authenticated and/or authorized to one or more locally provided services and/or applications even when the environment is in a disconnected state. Local access control information may be synchronized with source access control information stored externally to the environment (e.g., on the ground). These techniques may easily support different dis-connectable environments that are provided by an environment service provider, as well as support different sets of locally provided public and/or private services and/or applications and different sets of client applications across the different environments.

20 Claims, 5 Drawing Sheets

(56) References Cited

U.S. PATENT DOCUMENTS

| | | |
|---|---|---|
| 8,788,825 B1 | 7/2014 | Le et al. |
| 8,819,775 B2 | 8/2014 | Leconte et al. |
| 8,856,277 B2 | 10/2014 | Saugnac |
| 9,087,193 B2 | 7/2015 | Wahler |
| 9,088,613 B2 | 7/2015 | Wahler |
| 9,107,072 B2 | 8/2015 | Wong |
| 2004/0218558 A1 | 11/2004 | Johansson |
| 2012/0298737 A1* | 11/2012 | Thakar ............... B64D 11/0015 235/375 |
| 2014/0136658 A1 | 5/2014 | Wahler |
| 2014/0181904 A1 | 6/2014 | Craig et al. |
| 2014/0244761 A1* | 8/2014 | Dale ..................... G06Q 50/01 709/204 |
| 2015/0032800 A1* | 1/2015 | Hrabak ............... B60R 16/0231 709/203 |
| 2015/0065398 A1 | 3/2015 | Gartland et al. |
| 2015/0154576 A1 | 6/2015 | Frost et al. |
| 2016/0286258 A1* | 9/2016 | Rajagopal .......... H04N 21/2146 |
| 2017/0261978 A1* | 9/2017 | Gresch ................ G05D 1/0016 |

* cited by examiner

SYSTEMS AND METHODS FOR ON-BOARD ACCESS CONTROL

CROSS-REFERENCE TO RELATED APPLICATIONS

The present application is related to U.S. patent application Ser. No. 13/675,194, entitled "Communication System and Method for Nodes Associated with a Vehicle" and issued as U.S. Pat. No. 9,087,193; U.S. patent application Ser. No. 13/675,200 entitled "Vehicle Data Distribution System and Method;" and U.S. patent application Ser. No. 13/675,190, entitled "Ground System for Vehicle Data Distribution" and now issued as U.S. Pat. No. 9,088,613, the entire disclosures of which are hereby incorporated by reference in their entirety. The present application is also related to U.S. patent application Ser. No. 15/092,884, entitled "System and Methods for Authenticating Applications to On-Board Services" and filed concurrently herewith, the disclosure of which is hereby incorporated by reference herein in its entirety.

FIELD AND BACKGROUND OF THE DISCLOSURE

Technical Field

The instant disclosure generally relates to discovering and controlling access to services and applications within an environment that, as a whole, can be in a disconnected state, such as an environment that is on-board a moving vehicle.

Background

Providing communication services for individual devices (such as mobile phones, laptops, tablets, smart devices, etc.) while on-board vehicles is becoming more common. For example, a passenger may bring his or her individual device on-board an airplane and may utilize the device to access on-board communication services during flight, e.g., to browse the Internet, check email, view movies or films, connect to his or her workplace server, etc., and/or to communicate with other devices/parties that are on the ground via phone calls, texting, and the like.

Existing systems and methods for providing discovery and access control typically are directed at authenticating and/or authorizing individual devices (such as laptops, tablets, mobile devices, etc.) and/or at authenticating and/or authorizing individual users (e.g., via login/password, biometric data, etc.). These known access control techniques typically require communicating with an access control server or cloud to verify that the device and/or the user has appropriate credentials.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, a system for on-board access control may include one or more data storage devices fixedly connected to a vehicle. The one or more data storage devices may store information indicative of access control corresponding to one or more client applications, and the information indicative of access control corresponding to the one or more client applications may be local or on-board access control information. The system may further include an authorization and authentication (AA) service executed by one or more processors on-board the vehicle. The AA service may be configured to at least one of authenticate or authorize, based on the on-board access control information stored in the one or more data storage devices, a client application executing on a computing device that is on-board the vehicle. The local or on-board access control information may synchronized, via one or more wireless links, to master access control information that is stored in one or more remote data storage devices and that is provisioned by a remote provisioning computing device. The one or more remote data storage devices and the remote provisioning computing device may be disposed at respective locations other than at the vehicle, such as at respective locations on the ground.

In an embodiment, a system for on-board access control may include means for storing information indicative of access control of one or more client applications, where the information indicative of access control of the one or more client applications is local or on-board access control information. The means for storing the on-board access control information may be fixedly connected to a vehicle, for example. Additionally, the system may include means for at least one of authenticating or authorizing, based on the local or on-board access control information, a client application executing on a computing device that is on-board the vehicle. The local or on-board access control information may be synchronized, via one or more wireless links, to master access control information that is stored on one or more remote data storage devices and that is provisioned by a remote provisioning computing device. The one or more remote data storage devices and the remote provisioning computing device may be disposed at respective locations other than at the vehicle, such as on the ground.

An embodiment of a method for on-board access control may include storing, in one or more data storage devices fixedly connected to an aircraft, information indicative of access control corresponding to a plurality of client applications. The information indicative of access control corresponding to the plurality of client applications may be local or on-board access control information. The method may also include at least one of authenticating or authorizing, based on the local or on-board access control information, a client application executing on a computing device on-board the aircraft. The computing device may be configured to communicate with a ground-based device via one or more wireless communication links, for example. Additionally, the method may include synchronizing, via the one or more wireless communication links, the on-board access control information with master access control information that is stored in one or more ground-based data storage devices and that is provisioned by a ground-based provisioning computing device.

DETAILED DESCRIPTION OF THE PREFERRED EMBODIMENTS

Figure 1:
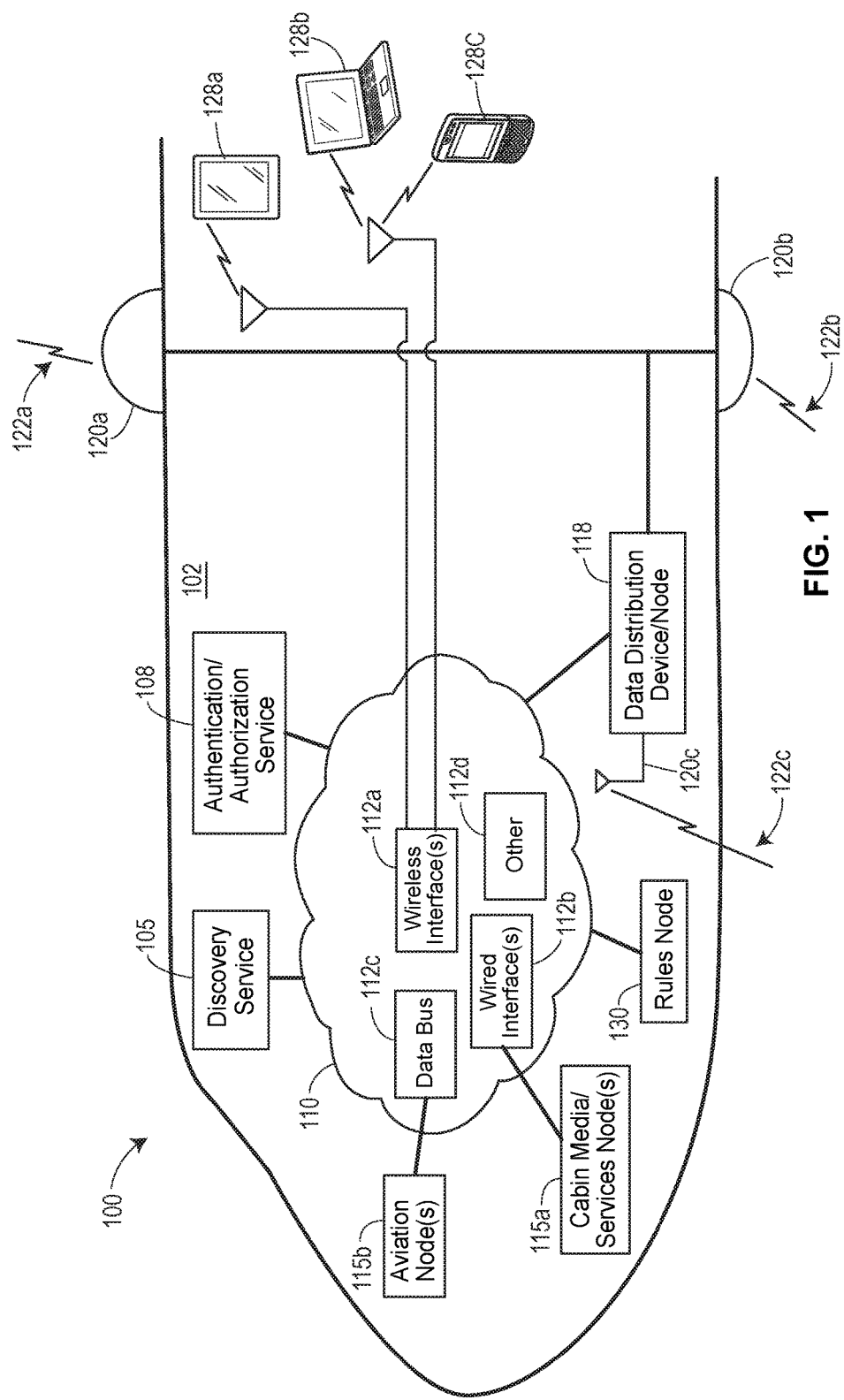
FIG. 1 illustrates an exemplary system for providing discovery, authentication, and/or authorization of services and/or applications in an environment that may become, as a whole, disconnected from other networks.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Discovery, authentication, and authorization of computing devices and/or users to gain access to applications and services typically utilize an access control service that is implemented or hosted on a server, bank of computers, or computing cloud. Generally, the physical machine(s) on which the access control service is implemented or hosted are located on the ground (e.g., are "ground-based"), and are accessed via the Internet or some combination of public and/or private ground-based networks. This presents a challenge for discovery, authentication, and/or authorization of devices and/or users that are located within an environment that is or may become disconnected from the Internet and/or other ground-based networks. That is, while local communication networks that are contained within the environment may be operating normally, these local communication networks as a whole may become disconnected from other external networks. Examples of such environments include a communication network that is disposed within the cabin of an aircraft and that may become disconnected from ground-based networks at some point during flight, and a ground-based communication network whose connection or interface to other networks is unreliable, for example, a communication network servicing an island community that utilizes a microwave link to interconnect with other networks. Communication networks that, as a whole, may from time to time become disconnected from ground-based networks are generally referred to herein as "dis-connectable."

Additionally, within a dis-connectable network, various devices or nodes connected thereto may provide various applications and services that are discoverable to other devices or nodes of the network. The particular set of discoverable applications and/or services may vary from dis-connectable network to dis-connectable network. For example, a first set of discoverable applications and/or services may be available on Flight A while a different set of discoverable applications and/or services may be available on Flight B, even if the same physical aircraft is used for both Flight A and Flight B. Further, the set of devices and/or users that may possibly consume these discoverable applications and/or services also may vary from dis-connectable network to dis-connectable network. For example, the set of passengers and crew members and their respective individual devices will vary across different flights.

The present disclosure addresses these and other challenges of providing discovery, authentication, and/or authorization within dis-connectable networks or environments, and in particular, providing such services while a dis-connectable network or environment is in a disconnected state, e.g., is disconnected or otherwise is not able to communicate with other networks, e.g., ground-based networks. FIG. 1 illustrates an embodiment of a system 100 for providing discovery, authentication, and/or authorization of services and/or applications in an environment 102 that may become disconnected from other networks. The dis-connectable environment 102 is shown in FIG. 1 as being located on-board an airplane in flight, however, the techniques described herein may easily be applied to dis-connectable environments that are in other locations, such as those that are on-board other vehicles, e.g., other types of aircraft, ships, trains, cars, buses, or any other type of vehicle that has the ability move through the air, on the ground, through space, or on water. In some scenarios, a dis-connectable environment 102 may not be contained within a vehicle, but may have a static location or footprint and a connection to other networks (e.g., gateway, link, etc.) that may from time to time become unreliable and/or disconnected.

For ease of discussion, the entity that provides and/or operates the dis-connectable environment 102 and that provides and/or operates communications service and connectivity for devices within the dis-connectable environment 102 is generally referred to herein as an "environment service provider." For example, an environment service provider may be an airline (or another company that is contracted by an airline) that provides in-flight communications services to passengers. On the other hand, the term "local service provider" is generally referred to herein as an entity within a dis-connectable environment 102 that provides a consumable service within the dis-connectable environment 102 for other entities or devices to consume. For example, a computing device or node within the dis-connectable environment 102 may be a local service provider that provides a streaming video service which may be consumed by other devices or nodes within the dis-connectable environment 102. The term "user," as generally used herein, refers to a person who operates or otherwise interacts with a computing device, such as a passenger, crew member, pilot, or other human being. For example, a user may purchase or otherwise receive services from an environment service provider, e.g., in-flight communication services, and may utilize his or her personal device (e.g., tablet, laptop, phone, smart device, e-reader, etc.) to access those services within the dis-connectable environment 102.

The system 100 may include a discovery service 105 and an authentication and/or authorization ("AA") service 108 that are located within the dis-connectable environment 102. For example, the discovery service 105 may be hosted on a node of a communication network 110 disposed within the environment 102, and the authentication/authorization service 108 may be hosted on a node of the communication network 110. FIG. 1 depicts the discovery service 105 and the AA service 108 as being hosted on different nodes of the network 110 for clarity of discussion; however, in some embodiments, the discovery service 105 and the AA service 108 may be hosted on a same node. Also for purposes of clarity of discussion, the discovery service 105 and the AA service 108 are discussed herein as separate services, however it is understood that in some embodiments the discovery service 105 and the AA service 108 may be provided via a single, integral service. Generally, though, both the discovery service 105 and the AA service 108 may be accessible via the communication network 110.

A "node," as generally referred to herein, may comprise one or more computing devices having one or more processors, a network interface, and one or more memories storing computer-executable instructions. The instructions may be executed by the processor(s) to perform one or more actions. For example, the computer-executable instructions may be executed to communicate, via the network interface, over one or more networks for various purposes, e.g., to discover other nodes, services, and/or applications, to publish or provide services to the network, to consume published or provided services, and/or to perform other actions. Additionally or alternatively, nodes may execute instructions stored thereon to host various services and/or to execute various applications, at some of which may be made available to other nodes. In some embodiments, a node may additionally or alternatively comprise firmware and/or hardware that are operable to perform one or more actions. In some embodiments, a node may include one or more user interfaces and/or a communicative connection to one or more user interfaces.

In some scenarios, a node may be a logical entity. For example, a node may comprise a virtual machine hosted by or executed on one or more computing devices, or a "node" may comprise an interpreted scripting or engine (e.g., a rules engine) hosted by or executed on one or more computing devices. As such, in some embodiments, multiple nodes may reside on a single, physical computing device.

In some embodiments, a node may be located on or within a vehicle so that the node is transported along with the vehicle as the vehicle moves, e.g., a "transported node." For example, a transported node may be an end-user consumer computing device such as a laptop computer, a handheld portable computing device, a phone, tablet or smart device, or other device that generally is not fixedly or rigidly attached to the vehicle by a tangible, physical connection. In other examples, a transported node may be a computing device that is fixedly and/or rigidly connected to a vehicle using a tangible, physical connection so that node is prevented from moving about the vehicle in an uncontrolled fashion when the vehicle moves. For example, a fixedly connected, transported node such as a navigation device, a cockpit electronics unit, a cabin electronics unit, or other device may be included in a line replaceable unit (LRU) on-board and fixedly connected to the vehicle. Indeed, a vehicle may transport multiple nodes, at least some of which are rigidly and fixedly connected to the vehicle, and at least some of which are not rigidly and fixedly connected to the vehicle. Typically, but not necessarily, the node hosting the discovery service 105 and the node hosting the AA service 108 may be fixedly connected to the vehicle.

For ease of discussion, the communication network 110 disposed within the dis-connectable environment 102 is generally referred to herein using the singular tense. However, it is understood that the communication network 110 may include one or more wired networks, one or more wireless networks, or a collection of wired and wireless networks. The one or more networks 110 may include private and/or public networks. In some embodiments, the network 110 may include multiple different types of wired and wireless network links or data bearer channels implementing different link-layer and network-layer protocols. For example, the one or more on-board networks 110 may include one or more wireless networks or interfaces 112a, such as a cellular communications network localized to the cabin of the aircraft, a Wi-Fi network, a wireless Ethernet network, Bluetooth® or other short distance wireless communications, near-field wireless communications (NFC), etc. On-board devices or nodes that have wireless communication abilities may connect to the network 110 via one or more wireless interfaces 112a, for example.

Additionally or alternatively, the one or more networks 110 may include one or more wired networks or interfaces 112b, such as a wired Ethernet, Local Talk, or other type of CSMA/CD (Carrier Sense Multiple Access/Collision Detection) network, token ring, FDDI (Fiber Distributed Data Interface), ATM (Asynchronous Transfer Mode), etc. Example of nodes that may connect to the network 110 via wired interfaces 112b include a cabin entertainment/media node that stores in-flight entertainment and other consumable content, and/or devices utilized by the cabin crew for flight services purposes (e.g., communications between crew members, passenger service and safety, etc.) (reference 115a). Further, in some embodiments, the network 110 may include an aircraft data bus or other suitable interface to on-board aviation-specific networks 112c via which connections may be established to, for example, cockpit electronics nodes, flight instrumentation systems, on-board maintenance systems, and the like (reference 115b). For example, the data is utilized by aviation nodes 115 be may be compliant with the ARINC (Aeronautical Radio, Incorporated)-429, MIL-STD (Military Standard)-1553, IEEE (Institute of Electrical and Electronics Engineers) 802.3, or other suitable standard. Still further, the network 110 may include other types of networks and interfaces 112d to other types of nodes (not shown). Examples of some (but not all possible) types of networks that may be included in the one or more networks 110 are described in aforementioned co-pending U.S. patent application Ser. No. 13/675,200 entitled "Vehicle Data Distribution System and Method", and in U.S. patent application Ser. No. 13/675,190 entitled "Ground System for Vehicle Data Distribution" and now issued as U.S. Pat. No. 9,088,613.

Another node of the on-board communication network 110 may be a data distribution node or device 118. The data distribution node or device 118 may be fixedly connected to the vehicle, and may be the node via which data is received onto and delivered from the vehicle. For ease of reading, the data distribution node or device 11 is referred to herein using the singular tense, as the node/device 118 may have a singular logical appearance to other nodes of the network 110. However, the data distribution node or device 118 may be implemented utilizing multiple physical computing devices or nodes, if desired.

Typically, the data distribution node or device 118 may be communicatively connected to one or more transceiver/antenna systems 120a, 120b, 120c over which data is transmitted via a corresponding wireless link or bearer that may communicatively connect to an antenna/transceiver disposed on the ground. For example, the data distribution node 118 may send and/or receive data via a satellite transceiver/antenna system 120a that uses a satellite wireless link or bearer 122a (e.g., over the Ku-band, Ka-band, L-band, S-band, etc.) to deliver data from and/or receive data onto the vehicle. Additionally or alternatively, the data distribution node 118 may send and/or receive data via an air-to-ground (ATG) transceiver/antenna system 120b that uses a non-satellite, ATG wireless link or bearer 122b (e.g., over the S-band, cellular/LTE bands, or other designated band) to deliver data from and/or receive data onto the vehicle, e.g., via one or more antennas located on the belly or the wing of an aircraft. Still additionally or alternatively, the data distribution node 118 may send and/or receive data via a Wi-Fi, cellular, or other ground-based wireless transceiver/antenna system 120c and link/bearer 122c to deliver data from and/or receive data onto the vehicle. (Typically, the ground-based wireless transceiver/antenna system 120c may have a shorter range than that of the other systems 120a, 120b and may be utilized only when the vehicle is not air-borne and/or is parked.) In some embodiments, the vehicle may include a transceiver/antenna system (not shown) over which data may be transmitted via a corresponding air-to-air wireless link that communicatively connects the vehicle with another air-borne vehicle. While FIG. 1 illustrates the system 100 as including multiple types of transceiver/antenna systems 120a, 120b, 120c via which data may be delivered onto and off of the vehicle, in some embodiments, the system 100 may include only one of the transceiver/antenna systems 120a, 120b for data delivery, and/or may not include the transceiver/antenna system 120c. Examples of data delivery links for transporting data to/from the dis-connectable environment 102 may be found in aforementioned U.S. patent application Ser. No. 13/675,200 and U.S. Pat. No. 9,088,613.

Generally, the data distribution node or device 118 may aggregate or otherwise package data received from on-board nodes for delivery off of the vehicle via one or more of the transceiver/antenna systems 120a-120c and respective wireless links 122a-122c. Additionally, the data distribution node or device 118 may disaggregate or otherwise un-package data received onto the vehicle via one or more of the transceiver/antenna systems 120a-120c and respective wireless links 122a-122c and route various data packets included therein via the network 110 to respective on-board destination nodes. Examples of embodiments of the data distribution node or device 118 may be found in aforementioned U.S. patent application Ser. No. 13/675,200 and U.S. Pat. No. 9,088,613. In an embodiment (not shown), the discovery service 105 and/or the AA service 108 may be included in the data distribution node or device 118.

Accordingly, when the environment 102 is in a dis-connected state, the one or more of the data delivery links 122a-122c accessed by the transceiver/antenna systems 120a-120c for data delivery may be unavailable, may be disconnected, may have a transmission quality and/or available bandwidth that is below a threshold, or may otherwise be unsuitable for use. In some situations, all data delivery links 122a-122c utilized by the transceiver/antenna systems 120a-120c may be unsuitable for use. In an embodiment, the data delivery node 118 may detect and maintain the status of usability of each of the data delivery links 122a-122c, as well as determine which one or ones of the data delivery links 122a-122c is a preferred or desired link.

Turning now to other nodes within the dis-connectable environment 102, at least some of the nodes within the environment 102 may join the on-board communication network 110 in an ad-hoc manner, typically (but not necessarily) by utilizing one or more wireless interfaces 112a. For example, passengers and/or crew members may bring their personal tablets 128a, computers 128b, phones/smart devices 128c, and other computing devices on-board the vehicle, and each of these devices 128a-128c may join the network 110 in an ad-hoc manner by utilizing any available on-board wireless technology, e.g., Wi-Fi, cellular, Bluetooth or other short-range protocol, NFC (near-field communications), etc. However, while different nodes that have connected in an ad-hoc manner may be communicatively coupled to one another through different types of data-bearer channels and network links, the different nodes may implement a common, higher-level (e.g., application layer) messaging protocol. Indeed, other nodes that are not connected in an ad-hoc manner (e.g., nodes 105, 108, 115a, 115b, 118, etc.) and/or that are connected to the network 110 via other interfaces 112b, 112c, 112d may also implement the messaging protocol. For example, a cockpit unit 115a may utilize an ARINC compatible data bus 112c to connect to the network 110, and a crew member's device 128c may utilize an IEEE 802.11 compatible wireless protocol 112a to connect to the network 110, yet the cockpit unit 115a and the crew member device 128c may still be able to communicate using the common messaging protocol. This common messaging protocol may provide, to nodes that do not have prior knowledge of one another, the ability to discover other nodes, authenticate and/or be authenticated, authorize and/or be authorized, publish or provide services or applications, discover available services or applications, consume or use services or applications, intercommunicate, and perform other actions, even though their respective network links may use different lower-level protocols and/or data bearer channels. As such, with the common messaging protocol, nodes may join and leave the network 110 and may communicate with other nodes of the network 110 without having prior knowledge of the structure of the network, and the network 110 is not required to include centralized network management. An example of such common messaging protocols which may be utilized in the dis-connected environment 102 may be found in aforementioned U.S. patent application Ser. No. 13/675,194 entitled "Communication System and Method for Nodes associated with a Vehicle" and now issued as U.S. Pat. No. 9,087,193.

One or more nodes of the network 110 may be local service providers. As discussed above, a local service provider may provide, publish, or otherwise make available a service or application to other nodes of the network 110, and as such may be referred to interchangeably herein as a "publisher." A node that utilizes or consumes a published or provided service may be generally referred to herein as a "consumer" of or a "subscriber" to the service. Examples of services or applications that may be provided and consumed may include, for example, streaming digital media such as videos or music, flight information services, distribution of vehicle maintenance data collected on vehicle, configuration of one or more devices on-board the vehicle, establishment of interconnectivity with devices that are not on-board the vehicle, etc. Other examples of possible services or applications that may be available within the dis-connectable environment 102 include a public branch exchange voice service, a time service, a global positioning system service, a domain name service, a wireless access point service, a storage service, a fault management and reporting service, a bearer data service, a software key service, a digital rights management service, a health monitoring and reporting service, and other services.

In an embodiment, at least one of the nodes of the network 110 may be a rules node 130 (also referred to interchangeably herein as a "rules engine 130") that stores and manages the set of rules according to which publishers/local service providers and subscribers/consumers enter into and maintain interrelationships in the network 110. Typically, the rules node 130 may be associated with a particular vehicle, and as such the rules node 130 may be fixedly and/or rigidly connected to the particular vehicle, and may be transported by the particular vehicle. The set of rules stored in the rules node 130 of the vehicle may be based on constraints and limitations of the various data bearer channels included in the network 110, and/or may be based on individual properties of the publishers/local service providers, subscribers/consumers, their respective users, services, and applications. As such, based on the boundaries defined by the set of rules, the publishers/local service providers and subscribers/consumers associated with the particular vehicle may provide and consume different services or applications over the network 110. In an embodiment, a rules node or engine 130 itself may also be a local provider of services and/or a consumer of services within the network 110.

It is noted that although FIG. 1 illustrates the rules node or engine 130, the discovery service node 105, the authentication and authorization node 108, and the data distribution node 118 as being distinct and separate nodes, in some embodiments (not shown) any two or more of the nodes 105, 108, 118, 130 may be integrally implemented on a single node. For example, the rules node or engine 130 may be included in the data distribution node or device 118.

Typically, but not necessarily, the discovery service node 105, the authentication and authorization node 108, the aviation nodes 115a, the cabin media/services nodes 115b, the data distribution node 118, and the rules node 130 are implemented in respective line-replaceable-units (LRUs) that are fixedly connected to the vehicle. An LRU may be an electronic assembly that performs a specific function in the aircraft 200 and that may be removed or replaced as a unit and serviced at an aircraft maintenance center or flight line. Of course, other types of nodes being transported by the vehicle 200 may be provided in respective LRUs. Further, in general, but not necessarily, one or more of the discovery service node 105, the authentication and authorization node 108, the aviation nodes 115a and cabin media/services nodes 115b, the data distribution node 118, and the rules node 130 may communicate over the network 110 by using a common messaging protocol, and additionally (and optionally) may communicate with other nodes using other protocols.

Figure 2:
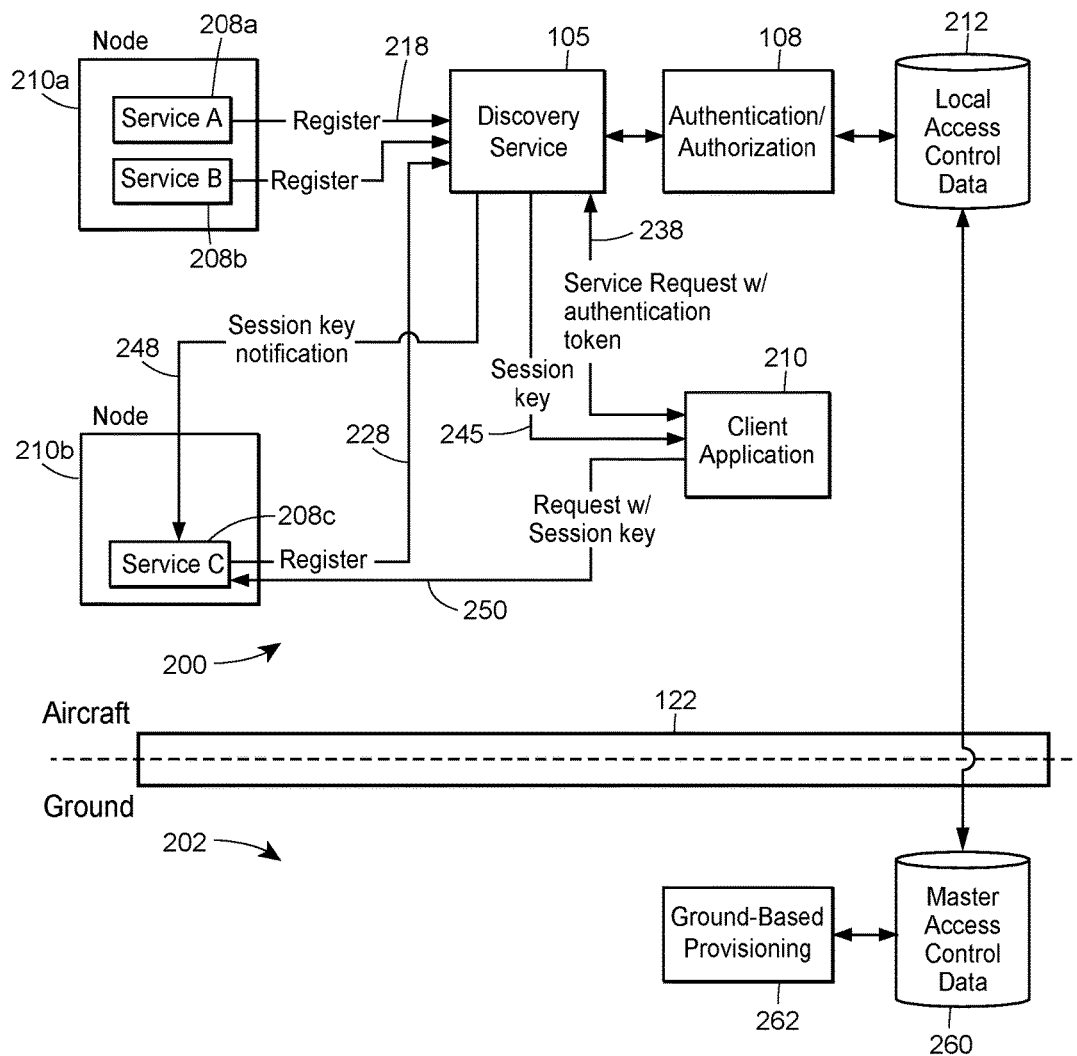
FIG. 2 is an example block diagram of a portion of the system of FIG. 1 interconnected with a portion of a ground-based network or system.

FIG. 2 depicts an example block diagram of a portion 200 of the system 100 of FIG. 1, and a portion 202 of a ground system with which the system 100 may communicate via one or more of the data delivery wireless links or bearers 122a-122c. For example, the system portion 200 may communicate with the ground system portion 202 by using one, two, or more of the bearers or wireless links 122a-122c. As such, when the desired bearer(s) 122 are operational and/or have a sufficient transmission quality, the system portion 200 (and indeed, the entire system 100) is in a connected state. Similarly, when the desired bearer(s) 122 are unavailable, not operational, or otherwise have insufficient transmission quality, the system portion 200 (and therefore the entire system 100) is in a dis-connected state. That is, in a dis-connected state, the system 100 is disconnected from or is not able to communicate with the ground network portion 202.

As shown in FIG. 2, the system portion 200 includes the discovery service 105 and the authentication/authorization service 108 which may be communicatively connected via the network 110 (as shown in FIG. 1 but not in FIG. 2). The discovery service 105 may also be communicatively connected, via the network 110, to one or more local services or applications 208a-208c that are provided within the dis-connectable environment 102, e.g., that are provided on-board the vehicle. For example, the local services or applications Service A 208a and Service B 208b may be hosted on or executed by a node 210a of the network 110 (which may or may not be an ad-hoc node, an LRU-based node, or a personal device of a passenger or crew member), and the local service or application Service C 208c may be hosted on or executed by another node 210b of the network 110 (which may or may not be an ad-hoc node, and LRU-based node, or a personal device of the passenger crew member). Additionally, the discovery service 105 may be communicatively connected via the network 110 to a client application 210 within the disc-connectable environment 102. The client application 210 may execute on or be hosted by yet another node of the network 110 (which may or may not be an ad-hoc node, and LRU-based node, or a personal device of the passenger crew member).

The interactions between the discovery service 105, the authentication and/or authorization service 108, the local services/applications 208a-208c, and the client application 210 may enable the client application 210 to discover at least some of the local services 208a-208c, be authenticated and authorized to consume one or more of the local services 208a-208c, and establish a secure connection or session with one or more of the local services 208a-208c. Generally speaking, the discovery service 105, in conjunction with the AA service 108, may enable various client applications (e.g., client application 210 and other client applications) to discover and gain access to various local services and/or applications provided within the dis-connectable environment 102. The authentication/authorization service 108 may access local or on-board access control information or data 212 disposed within the dis-connectable environment 102 to authenticate and/or authorize various locally provided/publishable services, locally provided/publishable applications, and/or local client applications. The local or on-board access control data 212 may include indications of permissions and/or credentials for various local services, publishable or provided applications, and/or client applications, for example. In an embodiment, the local access control information or data 212 may be implemented as a local Access Control List (e.g., a local ACL). In an embodiment, the local access control data 212 may be implemented in a database and/or on a data storage device that is communicatively connected to the network 110, and the content of the local access control information 212 may have been indicated or defined a priori by the environment service provider that is providing and/or operating the dis-connectable environment 102 and/or available communication services therein.

Figure 3:
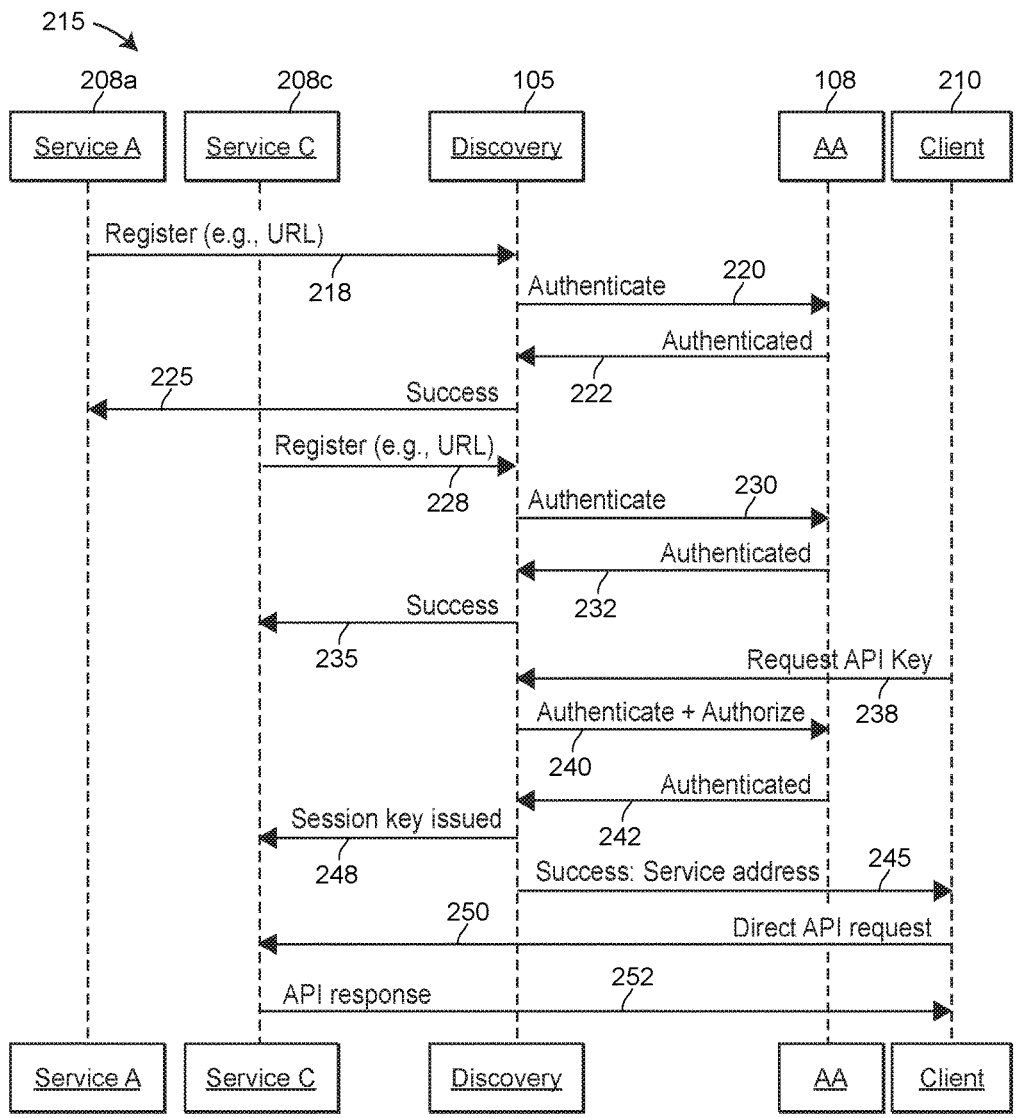
FIG. 3 depicts an example message flow between components of FIGS. 1 and 2.

To illustrate these and other concepts in a non-limiting manner, FIG. 2 is discussed with simultaneous reference with FIGS. 1 and 3. FIG. 3 is an example message flow diagram 215 that depicts interactions between the components 208a, 208c, 105, 108, and 210 of the system portion 200. Generally, the components 208a, 208c, 105, 108, and 210 shown in FIG. 3 may communicate via the network 110 by using a common messaging protocol, in a manner similar to that described above. The AA server 108 may access the local or on-board access control data 212 by using the common messaging protocol, or by using another access mechanism.

Turning first to the local Service A 208a in FIG. 3, upon its start-up or initialization, Service A 208a may register (reference 218) with the discovery service 105. For example, the discovery service 105 may have been assigned a static address or suitable indicator (e.g., a static IP address, network address, or URL) that is known a priori by Service A 208a, and Service A 208a may use the address of the discovery service 105 to send its registration request (reference 218). In an embodiment, different instances of the discovery service 105 disposed in different dis-connectable environments 102 may be assigned the same static address. For example, each instance of a discovery service 105 on each flight operated by ACME Airlines may be assigned the same static IP address. In an embodiment, the environment service provider that provides the dis-connectable environment 102 and communication services therein (e.g., ACME Airlines or other environment service provider) may assign, a priori, the static address of the discovery service 105 operating in the environment 102 as well as the static addresses of other instances of the discovery service 105 operating in other dis-connectable environments and/or communication services provided by the environment service provider. In another embodiment, the discovery service 105 may expose a standard API (Application Programming Interface) or other suitable interface via which local services 208 may register.

The registration request of Service A 208a (reference 218) may include an address or other indicator of the Service A 208a. For example, the registration request 218 may include an IP address, a network address, or a URL via which the Service A 208a may be accessed or reached. In some scenarios, the registration request 218 may include an indication of the identity and/or the type of service being registered. For example, the registration request 218 may include an indication of the identity and/or the type of Service A 208a. Examples of types of services which may be registered include ARINC 429 weather labels, GPS locations, etc.

Upon receiving the registration request from local Service A 208a, the discovery service 105 may authenticate (reference 220) Service A 208a with the authentication/authorization server 108. For example, the AA service 108 may determine whether or not local Service a 208a is a service that is allowed to be provided or published within the environment 102. To perform this authentication, the AA server 108 may access the local access control information or data 212 to determine whether or not the Service A 208a is allowed to be published or otherwise provided within the environment 102. Upon successful authentication of the local service 208a, the AA service 108 may indicate as such (reference 222) to the discovery service 105, the discovery service 105 may inform Service A 208a of its successful authentication (reference 225), and the discovery service 105 may maintain a record of the registration and authentication of Service A 208a. For example, the discovery service 105 may add an indication of the Service A 208a to a list or set of known or registered local services. Generally, the discovery service 105 may maintain a record of local services that are available (e.g., by way of registration) within the environment 102 and their respective related data, such as respective addresses, URLs, or other location indicators of the available local services.

A similar authentication procedure may be followed when local Service C 208c starts up or initializes. For example, Service C 208c may register (reference 228) with the discovery service 105, the discovery service 105 may request the AA service 108 to authenticate the local service 208c (reference 230), and the AA service 108 may access the local access control information or data 212 to perform the authentication. Upon successful authentication of the local service 208c, the AA service 108 may return an indication of such to the discovery service 105 (reference 232), the discovery service 105 may inform Service C 208c of its successful authentication (reference 235), and the discovery service 105 may maintain a record of the registration and authentication of the Service C 208c. For example, the discovery service 105 may add an indication of the Service C 208c to its list or set of known local services.

In some embodiments, service registration requests 218, 228 may each include respective credentials corresponding to the requesting service 208a, 208c. In an embodiment, the credentials may include a timestamp or other indication of a time interval during which the credentials of the requesting service 208a, 208c are valid or are invalid. Upon reception of the service registration request 218, 228, the discovery service 105 may determine whether or not the respective service's credentials have expired. If the respective service's credentials have expired, the discovery service 105 may deny, fail, and/or ignore the service's registration request 218, 228, thereby causing the respective service 208a, 208c to be unregistered and thus unavailable for consumption or access by other applications.

At some point in time after the respective registration and authentication of local services 208a, 208c, client application 210 may request (reference 238) a particular one of the local services, or may request knowledge of what local services are available within the environment 102. In the example message flow 215 shown in FIG. 3, client application 210 requests local service(s) (reference 238) by sending a service request to the discovery service 105, e.g., by using the static address of the discovery service 105. Included in the request 238 may be, for example, an indication of an identity and/or type of a particular requested service that is being requested by the client application 210 (e.g., an indication of the identity and/or the type of Service C 208c), an indication of a general request for available services, and/or a token. In an embodiment, the token may be an authentication token that is signed by the same party that assigned the address of the discovery service 105. For example, the environment service provider providing/operating the dis-connectable environment 102 and/or the communication services therein may have signed the authentication token provided by the client application 210 included in the service request 238. In an embodiment, the request for service(s) 238 may comprise a request for a key to an API (Application Programming Interface) exposed by the requested Service C 208c and that the client application 210 may be able to use to gain access to the service 208c, e.g., by means of a network address, URL, port, etc. provided by the API. In an embodiment, the request for service(s) 238 may comprise a request for a key to an API (Application Programming Interface) exposed by multiple available services and that the client application 210 may be able to use to gain access to the multiple available services, e.g., by means of a network address, URL, port, etc. provided by the API.

Upon receipt of the local service request 238, the discovery service 105 may authenticate and/or authorize (reference 240) the client application 210 to verify or ensure the credentials of the client application 210. For example, the discovery service 105 may ask the AA service 108 to authenticate and/or authorize the client application 210 to the local service 208c and/or to available services, e.g. by accessing and examining contents of the local access control information or data 212. Upon a successful authentication and/or authorization of the client application 210, the AA service 108 may return an indication of such to the discovery service 105 (reference 242).

In some embodiments, local service request 238 may include credentials corresponding to the client application 210. In an embodiment, the credentials may include a timestamp or other indication of a time interval during which the client application's credentials are valid or are invalid. Upon reception of the local service request 238 from the client application 210, the discovery service 105 may determine whether or not the client application's credentials have expired. If the respective client application's credentials have expired, the discovery service 105 may deny the client application's request for services 238.

Of particular note is that FIG. 3 illustrates the authentication and authorization of the particular client application 210, in contrast to the authentication and authorization of the node or device on which the particular client application 210 is executing, and in contrast to the authentication and authorization of a particular user of the client application 210. Indeed, in some embodiments, multiple authentications and/or authorizations may be performed. For example, a particular computing device may first be authenticated and/or authorized, and then the client application 210 executing on the device may be separately authenticated and/or authorized. Additionally or alternatively, a user of the client application 210 and/or of the physical device may be separately authenticated and/or authorized (e.g., via a login/password, biometrically, etc.) from the authentication and/or authorization of the device itself and/or from the authentication and/or authorization of the client application 210 executing thereon.

Returning again to the client application 210, the client application 210 may have been provided by environment service provider of the environment 102. That is, the environment service provider may provide or otherwise make available the client application 210 to execute on various devices and nodes of the network 110, thereby enabling such devices and nodes to operate within the environment 102. For example, the client application 210 may be downloaded or stored onto a passenger's personal device prior to boarding the vehicle or prior to the passenger attempting to access the on-board network 110 using his or her personal device. The client application 210 may be particularly configured to allow and/or enable communications over the network 110 with other nodes, services, and/or applications (e.g., by utilizing the common messaging protocol, making various addresses known, etc.). In some embodiments, the client application 210 may be particularly configured to allow and/or enable communications between the device on which it is executing and ground-based networks (e.g., ground-based devices connected to the ground-based networks, or applications executing on the ground-based devices connected to the ground-based network) via the network 110 while the vehicle is in in transit, e.g., the aircraft is in-flight. Moreover, a client application 210 that is provided by the environment service provider may include controls that are unique and/or necessary for in-flight and/or dis-connectable environments. For example, the client application 210 may prevent a passenger's personal device from accessing aviation-related or other secured portions of the network 110, and/or the client application 210 may compensate a passenger's account for time during which the environment 102 is unexpectedly in a dis-connected state. In an embodiment, the client application 210 may provide a portal or access mechanism to selected portions of the on-board communication network 110 and various local services and/or applications provided therein.

As the client application 210 may be originated or sourced from the environment service provider (e.g., may be downloaded or otherwise received from a server, server bank, or server cloud that is operated and/or maintained by the environment service provider), a common or standard request for service(s) may be included within the client application 210 for use in discovery. This common or standard request for service(s) may be utilized by the client application 210 in any dis-connectable environment 102 of the environment service provider to communicate with the resident discovery service 105 in order to gain knowledge of and access to available services within the particular environment 102 in which the client application 210 is located. In an embodiment, the common or standard request for service(s) may include the static address or location indicator of the discovery service 105 which, as previously mentioned, may be common or standard across various dis-connectable environments 102 of the environment service provider.

In some scenarios, different types of client applications 210 may be downloaded or provided to different devices that may be on-board a vehicle or otherwise disposed within the dis-connectable network 102. For example, one type of client application may be downloaded to or stored on passengers' devices or devices operated by the general public, while another type of client application may be downloaded to or stored on devices that are operated by federal air marshals, and still another type of client application may be downloaded to or stored on devices that are operated by airline personnel. Further, different client applications may be downloaded and/or stored on on-board devices that have different functions. For example, one type of client application may be downloaded to devices that collect data on in-flight behavior of various systems within the aircraft, and another type of client application may be downloaded and/or stored by devices that are utilized by cabin crew to track and order hospitality inventory. In an embodiment, each type of client application 210 that is provided by the environment service provider may include the common or standard request for service(s) that enables each instance of the client application 210 to communicate with a respective discovery service 105 to discover and gain access to available local services.

Further, different types of client applications may have differing permissions for access to different on-board local services and/or applications which may be reflected by the local or on-board access control data 212. In an embodiment, certain local services and/or applications may be considered to be "private." For example, certain local services may only allowed to be accessed by client applications particular to aircraft maintenance, and other services may be only allowed to be accessed by client applications particular to aircraft flight and navigation. Other local services may be considered to be "public," and may be generally available to client applications particular to passengers and/or general purpose computing devices. For example, a local service that provides, via the network 110 during flight, data communications between passenger devices and devices on the ground may be a public service. The permissions or access control data indicating the particular local services to which particular client applications are credentialed or allowed/authorized access may be reflected within the data stored in the local or on-board access control information or data 212. Generally, the local or on-board access control data 212 stores permission and/or credentialing data respectively corresponding to local services, local applications, and/or client applications and their interactions or relationships.

At any rate, returning to FIG. 3, in conjunction with authenticating and authorizing the client application 210 (references 240, 242), the discovery service 105 may determine, based on its records, that Service C 208c is a registered and authenticated service. Based on this determination, the discovery service 105 may issue or generate a session key (e.g., an API session key) that may be utilized by both Service C 208c and the client 210 to establish secure communications therebetween. In an embodiment, the session key may be entirely randomly generated, and as such may not contain any identity information or other discernible patterns. In an embodiment, the session key may be partially randomly generated. In some embodiments, the session key may be configured to expire or have a finite time-to-live. For example, the session key may be configured to expire after a certain amount of time has elapsed, e.g., as determined by a clock source that is disposed locally within the environment 102, and which may be synchronized with a clock source disposed external to the environment 102 such as a clock source that is located on the ground. Additionally or alternatively, the session key may be configured to expire after a vehicle on which the environment 102 is located has completed a travel leg or flight, and/or when one or more components, applications, services, and/or other portions of the system 200 are shut down or restarted.

The discovery service 105 may provide the generated session key and the address of Service C 208c (e.g., the service's URL or Uniform Resource Locator, IP address, or similar service address) to the client application 210 (reference 245), and the discovery service 105 may notify the service 208c of the generated session key (reference 248). Subsequently, the client application 210 may utilize the session key and the address of Service C 208c to access the service's API (reference 250) to establish a secure communication session with the service 208c and access thereto. For example, the client application 210 may directly transmit an API request including the session key to the local service 208c (reference 250), and the service 208c may respond with an API response (reference 252), thereby establishing a direct, secured communication session between the client application 210 and Service C 208c via the service's API. Indeed, once the session key is known by both the client application 210 and by the local service 208c, session communications therebetween may be initiated, established, and maintained therebetween independently of the discovery service 105 and of the AA service 108.

In an embodiment, the API via which the client 210 accesses Service C 208c may be unique to Service C 208c. That is, different services 208a-208c may expose respective APIs via which they may be particularly accessed. In some embodiments, the API via which the client 210 accesses the local service 208c is common to multiple (or even all) local services provided within the environment 102. For example, more than one service (or even all services) that are provided by the environmental service provider of the environment 102 may share a common, standard API via which they may be accessed within the environment 102. In these embodiments, as the client 210 has received the common API and has directly connected to the local service 208c via the common API (references 250, 252) and session key, and as the discovery service 105 maintains a record of available, registered services, the client 210 may authenticate subsequent requests for or otherwise gain access to other local services by using the session key and common API. As such, the client application may be enabled to discover and utilize registered local services within the environment 102 merely by utilizing the standard API corresponding to on-board local services, and without needing to know where or how those local services are configured and/or located within the environment 102.

As previously discussed, the sets of local services that are provided on board different dis-connectable environments 102 (e.g., on board different aircrafts and/or different flights) may differ. For example, a set of local services that are made available on cross-country flights may differ from a set of local services that are made available on short-haul flights. In another example, a set of local services that are made available on a commercial flight may differ from a set of local services that are made available on a private jet. As such, in any given dis-connectable environment 102 (e.g., in different aircraft and/or on different flights), a particular local service may be unavailable or may be of a different version or class than that provided on another aircraft or flight. However, as on-board local services register with the system 100, client applications 210 may be shielded from needing to have knowledge of the availability, configurations, versions, classes, addresses, and/or locations of the particular set of local services that are available within a particular dis-connectable environment 102. Rather, client applications 210 merely may access the local discovery service 105 to determine the locally available services and gain access thereto, and may remain unaware or ignorant of the underlying configurations of said services.

Further, discovery, authentication, and authorization of local services and applications may be performed within the environment 102 even when the environment 102 as a whole is in a dis-connected state, at least because the discovery service 105, the authentication/authorization service 108, and the local access control data 212 are locally disposed within the network 110 of the environment 102, and therefore are locally accessible to nodes of the network 110 even when the environment 102 as a whole is in a dis-connected state. As such, nodes of the network 110 may easily access the discovery service 105 to gain access to on-board local services and applications, even when the environment 102 as a whole is in a dis-connected state, e.g., when the links 122a-122c are unavailable or are not operating above a quality threshold and the network 110 is unable to communicate with networks that are external to the environment 102, such as ground-based networks.

The contents of the local or on-board access control information or data 212, however, may be a local copy of master access control information or data 260 that is stored in a ground-based network 202 or in another location that is remote from the environment 102 (e.g., another vehicle or aircraft, a satellite, or other airborne data storage location). Referring again to the example illustrated in FIG. 2, the master access control information or data 260 may be implemented or stored in one or more databases and/or data storage devices within the ground-based network 202 or other remote location and, in an embodiment, may be implemented as a master Access Control List (e.g., a master ACL). The master access control information or data 260 may be an originating or primary source of access control, permissions, and credentials for local services, local applications, and/or client applications within dis-connectable environments. The contents of the master access control data 260 may be provisioned, for example, by a ground-based provisioning system 262 that is a part of the ground-based network 202 or that is accessible via the ground-based network 202. In remote location. In an embodiment, the environment service provider may utilize the ground-based provisioning system 262 to populate and/or configure the master access control information or data 260 with various access permissions and credentials corresponding to services and/or applications that may be provided in and/or that may operate in various dis-connectable environments.

The contents of the local or on-board access control information or data 212 may be synchronized with the contents of the master access control information or data 260. For example, synchronization may occur periodically and/or on demand when one or more bearers 122 are available or of sufficient quality. In some scenarios, particular events or conditions may automatically trigger synchronization. For example, if a desired bearer (e.g., the non-satellite ATG bear 122b) has been unusable for a certain amount of time and eventually returns to a usable state, a synchronization of the local access control data 212 and the master access control data 260 may be triggered by the occurrence of its newly usable state. For example, the system portion 200 and/or the ground-based network 202 may detect the desired bearer has returned to service and trigger the synchronization. Generally, synchronization of the local access control data 212 with the master access control data 260 may be performed independently of discovery, authentication, and/or authorization activities within the environment 102. That is, synchronization between access control data 212, 260 may not be triggered by or otherwise directly tied to any discovery, authentication, and/or authorization activities. However, even though synchronization between access control data 212, 260 may be independent of discovery, authentication, and/or authorization, the discovery service 105, the AA service 108, and/or the data distribution node 118 may initiate and/or perform the synchronization. In some embodiments, the ground-based provisioning system 262 and/or other node of the ground-based network 202 may initiate and/or perform a synchronization of the access control data 212, 260.

In some scenarios, local or on-board access control information or data 212 within a particular environment 102 is synchronized with only a portion of the master access control information or data 260. For example, a subset of access control permissions stored in the master access control data 260 may be selected based on the passenger and crew list of a particular flight and the selected subset may be uploaded to or synchronized with the local access control data 212 servicing the particular flight. In another example, master access control permissions for local services that are provided on board short-haul flights may be uploaded to and/or synchronized with the local access control information 212 servicing a short-haul flight, while master access control permissions for local services that are only provided on board long-haul flights may be omitted. Other criteria based on which contents of the master access control information or data 260 may be filtered for upload and/or synchronization with a local access control information or data 212 may be possible.

In some embodiments, default access permissions for various registered services and/or client applications while the environment 102 as a whole is in a dis-connected state, and/or based on a synchronization state of the local access control information or data 212 with the master access control information or data 260, may be defined or provided. For example, access permissions of one or more client applications to a first registered service may default to "allow local access when the environment 102 as a whole is in a dis-connected state," and access of one or more client applications to a second registered service may default to "deny local access when the environment 102 as a whole is in a dis-connected state."

Additionally or alternatively, granting and/or denying access of one or more client applications to one or more registered services may be based on time elapsed from the previous synchronization of the local access control information 212 with the master access control information 260. For example, local access of one or more client applications to one or more registered services while the environment 102 as a whole is in a dis-connected state may be allowed if the time elapsed since the previous synchronization is less than a certain time duration, and may be denied if the time elapsed since the previous synchronization is greater than a certain time duration. In another example, local access of one or more client applications to one or more registered services while the environment 102 as a whole is in a dis-connected state may be denied if a pending synchronization is scheduled or otherwise expected to occur within a given time interval. Elapsed times and/or time intervals may be determined based on a clock source that is locally disposed within the environment 102, for example. The local clock source may be synchronized with a clock source that is disposed externally to the environment 102, such as a ground clock source.

The default access permissions corresponding to when the environment 102 as a whole is in a dis-connected state and/or based on a synchronization state of access control information 212, 260 may be stored with the local access control information or data 212 and/or with the discovery service 105, in an embodiment. In an embodiment, granting and/or denying access based on said default permissions may be managed by the discovery service 105. Default permissions for various services and/or client applications while the environment 102 as a whole is in a dis-connected state and/or based on a synchronization state of access control information 212, 260 may be synchronized between the local access control information or data 212 and the master access control information or data 260, for example. Local manual changes to said permissions within the environment 102 may be provided, if desired.

Figure 4:
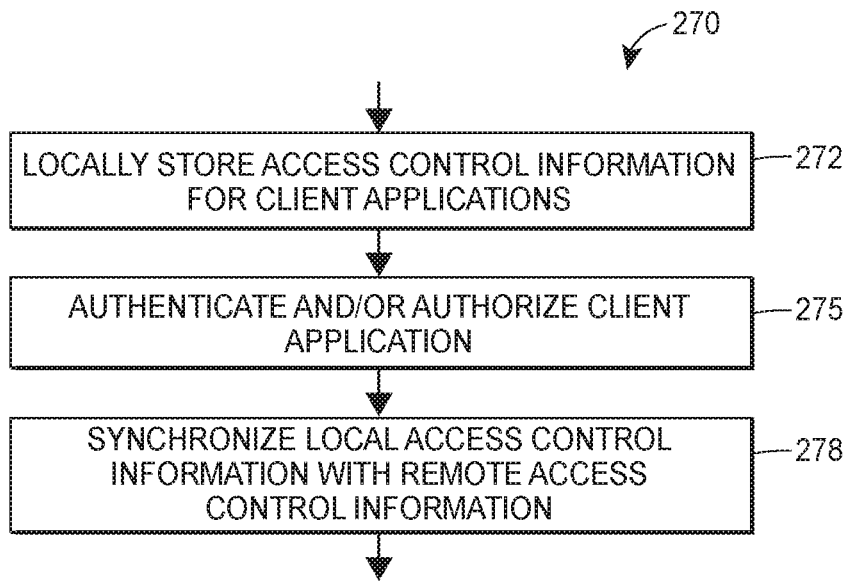
FIG. 4 is an example flow diagram of a method for providing discovery, authentication, and/or authorization of services and/or applications in an environment that may become, as a whole, disconnected from other networks.

FIG. 4 is an example flow diagram of a method 270 that may be performed by one or more parts of the system 100 and/or the by the system portion 200 of FIG. 2. Of course, the method 270 may be performed by systems other than the system 100. However, for ease of illustration and not for limitation purposes, the method 270 is discussed below with simultaneous reference to FIGS. 1-3.

At a block 272, the method 270 may include storing information indicative of access control corresponding to one or more client applications that are executing within a dis-connectable environment, such as the environment 102. The access control information or data may indicate which particular client applications are credentialed for or authorized to access which particular services and/or applications that may be locally provided within the dis-connectable environment. In an embodiment, the access control information or data may be locally stored in one or more data storage devices disposed within the dis-connectable environment (e.g., the one or more storage devices 212), and as such, the access control information or data may be local access control information or data. For example, when the dis-connectable environment is within an aircraft, the access control information may be on-board access control information or data stored within one or more data storage devices housed in an LRU. In an embodiment, the local access control information or data may be stored as a local Access Control List or ACL.

The local access control information or data may comprise a copy of at least a portion of master access control information or data that is stored remotely from the dis-connectable environment (e.g., the master access control data set 260). That is, the master access control information or data may not be stored within the dis-connectable environment (e.g., may be stored remotely), and may be provisioned by a provisioning computing device or system that is also remotely located with respect to the dis-connectable environment (e.g., the provisioning system or device 262). In an embodiment, the master access control information or data may be stored in the remote one or more data storage devices. In an embodiment, the master access control information or data may be stored as a master Access Control List or ACL.

In an embodiment, the contents of the local access control information may be a subset of the contents of the master access control information. For example, the contents of the master access control information may be filtered based on one or more criteria to determine the subset that is to be locally stored and accessible within the dis-connectable environment.

At a block 275, the method 270 may include at least one of authenticating or authorizing a client application executing in the dis-connectable environment (e.g., the client application 210) based on the locally stored access control information or data. The client application may be executing on a node or a computing device disposed within the dis-connectable environment, and authorizing and/or authenticating the client application may include authorizing and/or authenticating the client application to access a particular local service or application that is available within the dis-connectable environment. In some embodiments, at authorizing and/or authenticating the client application may include authorizing and/or authenticating the client application to access more than one local service or application that is available within the dis-connectable environment. For example, the client application 210 may request a discovery service 105 to provide and/or coordinate the authentication and/or authorization of the client application 210 to one or more services that are known to the discovery service 105, e.g., by utilizing or accessing the locally stored access control information or data.

In some scenarios, the node or the computing device on which the client application is executing may be communicatively connected (e.g., via a wireless link such as one of links 122a-122c) to another device that is not disposed within the dis-connectable environment. For example, the node or computing device on which the client application is executing may be disposed within a dis-connectable environment onboard an aircraft and may be communicatively connected to a device that is not onboard the aircraft, e.g., a device that is on the ground. In an embodiment, the client application (e.g., client application 210) executing on the node or computing device enables the communicative connections with other devices that are not disposed within the dis-connectable environment. In an embodiment, an application other than the client application executing on the node or computing device enables the communicative connections with other devices that are not disposed within the dis-connectable environment or with applications executing on the other devices.

In an embodiment, the computing device on which the client application is executing is a mobile computing device, such as a tablet, laptop, smart phone, or other smart device. In such embodiments, the method 270 may include at least one of authenticating or authorizing the mobile computing device (not shown) prior to at least one of authenticating or authorizing the client application executing thereon (block 275). The method 270 may also or alternatively include at authorizing and/or authenticating a user of the mobile computing device (not shown) in addition to authorizing and/or authenticating the client application (block 275), either prior to or after authenticating and/or authorizing the client application (block 275).

In an embodiment, the method 270 may be performed on-board a vehicle, and at least one of authenticating or authorizing the client application (block 275) may be performed while the vehicle is in transit. For example, when the vehicle is an aircraft, at least one of authenticating or authorizing the client application (block 275) may be performed while the aircraft is in flight. In some scenarios, at least one of authenticating or authorizing the client application (block 275) may be performed while the dis-connectable environment as a whole is in a disconnected state. For example, at least one of authenticating or authorizing the client application (block 275) may be performed while the wireless link(s) via which is data delivered to/from the aircraft is unavailable, disconnected, has a transmission quality less than a particular threshold, or otherwise is not usable.

At a block 278, the method 270 may include synchronizing, via one or more wireless links, the local access control information or data with the master access control information or data. Synchronization (block 278) may be initiated periodically, and/or may be initiated on demand. In some situations, synchronization (block 278) may be automatically triggered by the occurrence of an event, such as a restoration of a wireless link back to service. Generally, the blocks 275 and 278 may be performed independently of each other. For example, the block 278 may be executed prior to an execution of the block 275, and/or after an execution of the block 275. Typically, the execution of the block 275 may not be required to trigger or otherwise cause an execution of the block 278.

Figure 5:
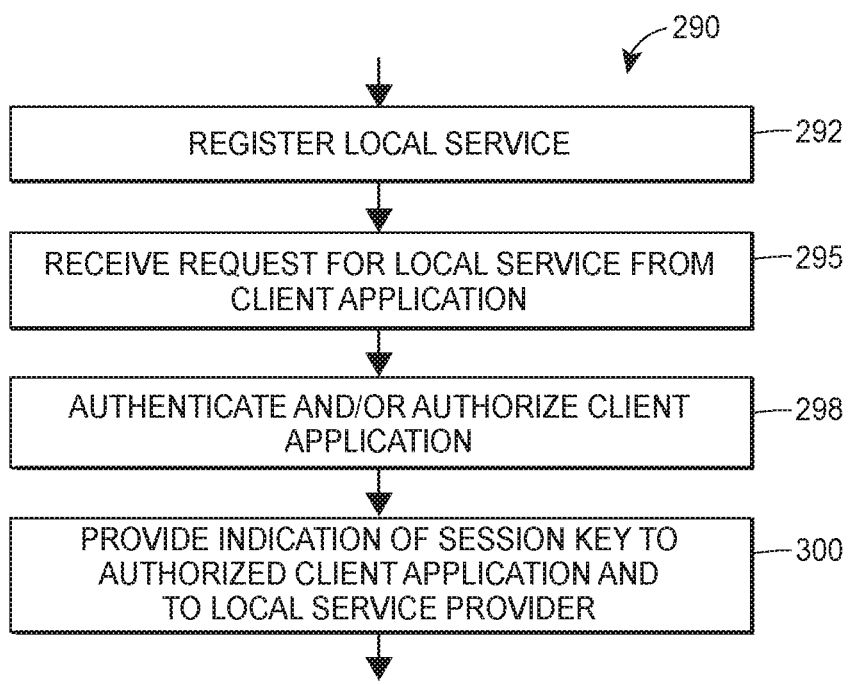
FIG. 5 is an example flow diagram of a method for providing discovery, authentication, and/or authorization of services and/or applications in an environment that may become, as a whole, disconnected from other networks.

FIG. 5 is an example flow diagram of a method 290 that may be performed by one or more parts of the system 100 and/or the by the system portion 200 of FIG. 2. Of course, the method 290 may be performed by systems other than the system 100. However, for ease of illustration and not for limitation purposes, the method 270 is discussed below with simultaneous reference to FIGS. 1-3. In some embodiments, at least some portions of the method 290 may be performed in conjunction with at least some portions of the method of 270.

At a block 292, the method 290 may include registering a local service that is provided by a node or computing device that is on-board a vehicle. The local service may be registered with a discovery service that is also onboard the vehicle, for example, such as the discovery service 105. Registering the local service may include authenticating and/or authorizing the local service to be provided or published on-board the vehicle, e.g., so that the local service may be accessed and/or consumed by other nodes and/or applications that are on-board the vehicle. For example, the discovery service 105 may operate in conjunction with the authentication and/or authorization service 108 to authenticate and/or authorize the local service. Authentication and/or authorization of the local service may be based on local access control information or data stored in one or more data storage devices that are on board the vehicle, e.g., the local access control information or data 212.

At a block 295, the method 290 may include receiving a request for local services. The request may be received, for example, at the discovery service from a client application that is executing on a computer device or node that is onboard the vehicle, e.g., the client application 210. The request for local services may be a request specifically indicating a particular local service, a request specifically indicating more than one local service, or a general request for all available local services.

At a block 298, the method may include causing the client application (e.g., the client application 210) to be at least one of authenticated or authorized. For example, upon reception of the request for services, the client application may be authenticated and/or authorized. In an embodiment, the client application may first be authenticated, and then may be authorized. In an embodiment, the client application may be authenticated and/or authorized for accessing or consuming a particular local service/application or group of local services/applications. Authenticating and/or authorizing the client application may be based on locally stored access control information that is onboard the vehicle. For example, the authentication and/or authorization of the client application may be performed by an authentication and authorization service (e.g., the AA service 108) that is on-board the vehicle and in communicative connection with a discovery service (e.g., the discovery service 105), and may be based on local access control information or data stored in one or more data storage devices that are on board the vehicle (e.g., the local access control information or data 212).

In an embodiment (not shown), the client application may be authenticated and/or authorized after the computing device on which the client application is executing has been authenticated and/or authorized. In an embodiment (not shown), a user of the client application and/or the computing device on which the client application executing may be authenticated and/or authorized.

At a block 300, the method 290 may include providing an indication of a session key which may be utilized by the node and the client application to establish a secure connection therebetween. For example, the discovery service 105 may provide an indication of a session key to a local service and/or to a node hosting the local service (e.g., a local service provider), and may provide a session key to the authorized client application 210. As previously discussed with respect to FIG. 3, the session key may be at least partially randomly generated, and/or the session key may be configured to expire based on a time interval, a shutdown or restart of one or more components, applications, services, and/or other portions of the system 200, or the occurrence of an event corresponding to the environment 102, such as at the end of a flight of an aircraft.

The session key and the secured connection may thereby provide the client application access to the registered local service provided by the node. For example, an API request and response may be transmitted via the secured connection, thereby providing the client application access to the registered local service. In some embodiments, the session key may thereby provide the client application access to multiple registered local services on-board the aircraft.

In an embodiment, a registered local service with which the client application has established a secured connection may enable the client application to communicate with devices and/or applications executing on computing devices that are not onboard the vehicle (e.g., that are on the ground), and in particular, communicate with such devices and/or applications while the vehicle is in transit. For example, if the vehicle is an aircraft, the registered local service may enable the client application to communicate with off-board devices and/or applications while the aircraft is in flight.

Figure 6:
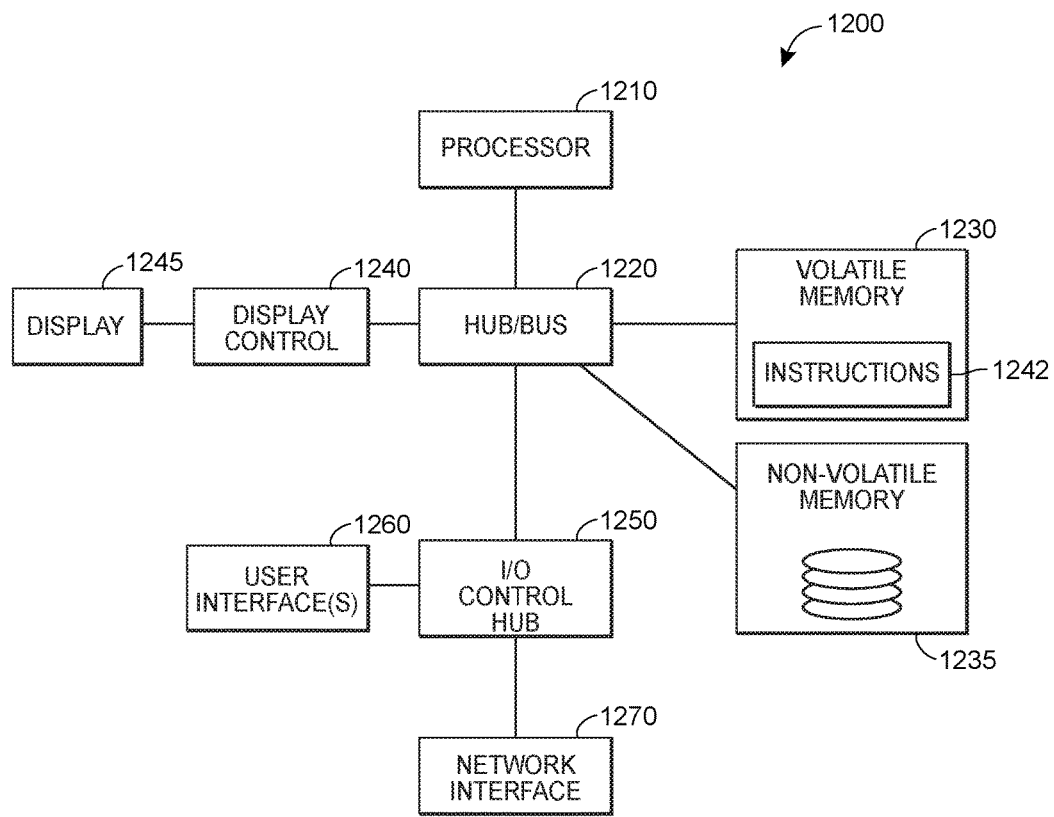
FIG. 6 is a block diagram of an example computing device that may be used in the system of FIG. 1.

FIG. 6 illustrates an embodiment of a computing device 1200 that may be included in any or all of the nodes associated with the system 100 of FIG. 1. Additionally, other devices illustrated in FIGS. 1 and 2 such as the individual or personal computing devices 128a-128c may include at least some portions of the computing device 1200. The device 1200 may include, for example, one or more central processing units (CPUs) or processors 1210 and one or more busses or hubs 1220 that connect the processor 1210 to other elements of the computing device 1200, such as one or more volatile memories 1230, one or more non-volatile memories 1235, a display controller 1240, and an I/O controller 1250. The volatile memories 1230 and the non-volatile memories 1235 may each include one or more non-transitory, tangible computer readable storage media such as random access memory (RAM), read only memory (ROM), FLASH memory, a hard disk drive, a digital versatile disk (DVD) disk drive, a Blu-ray disk drive, etc.).

In an embodiment, the memory 1230 and/or the memory 1235 may store instructions 1242 that are executable by the processor 1210. For example, the instructions may include instructions comprising the discovery service 105, the authentication and authorization service 108, the rules engine 130, data distribution 118, and the like. Indeed, each of the modules, applications, and/or engines described herein can correspond to a set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 1230, 1235 stores a subset of the modules and data structures identified herein. In other embodiments, at least one of the memories 1230, 1235 stores additional modules and data structures not described herein. In some embodiments, at least portions of the modules, applications, and/or engines may be implemented in firmware and/or in hardware.

In an embodiment, the display controller 1240 may communicate with the processor 1210 to cause information to be presented on a connected display device 1245. In an embodiment, the I/O controller 1250 may communicate with the processor 1210 to transfer information and commands to/from the user interface 1260, which may include a mouse, a keyboard or key pad, a touch pad or screen, click wheel, lights, a speaker, a microphone, etc. Additionally, data or information may be transferred to and from the computing device 1200 via a network interface 1270. For example, data or information may be transferred to and from the network 110. In some embodiments, the computing device 1200 may include more than one network interface 1270, such as one or more wireless interfaces and one or more wired interfaces.

The computing device 1200 is only one example of a computing device 1200, and other suitable devices can have more or fewer components than shown, can combine two or more components, or a can have a different configuration or arrangement of the components. The various components shown in FIG. 6 can be implemented in hardware, firmware, a processor executing software instructions, or a combination of hardware, firmware, and/or a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A system, comprising one or more data storage devices fixedly connected to a vehicle, the one or more data storage devices storing information indicative of access control corresponding to one or more client applications, the information indicative of access control corresponding to the one or more client applications being on-board access control information; and an authorization and authentication (AA) service executed by one or more processors on-board the vehicle, the AA service configured to at least one of authenticate or authorize, based on the on-board access control information stored in the one or more data storage devices, a client application executing on a computing device that is on-board the vehicle, wherein the on-board access control information is synchronized via one or more wireless links to master access control information that is stored in one or more remote data storage devices and that is provisioned by a remote provisioning computing device, the one or more remote data storage devices and the remote provisioning computing device disposed at respective locations other than at the vehicle.

2. The system of the preceding aspect, wherein the vehicle is an aircraft.

3. The system of the preceding aspect, wherein the aircraft is in-flight.

4. The system of any one of the preceding aspects, wherein the vehicle is moving, in transit, or traveling between an origination and a destination.

5. The system of any one of the preceding aspects, wherein the one or more wireless links include at least one of an air-to-ground link, an air-to-air link, or a satellite link.

6. The system of the preceding aspect, wherein the one or more wireless links include an air-to-ground link.

7. The system of any one of aspects 5 or 6, wherein the one or more wireless links include an air-to-air link.

8. The system of any one of aspects 5-7, wherein the one or more wireless links includes a satellite link.

9. The system of any one of the preceding aspects, wherein the client application executing on the computing device is at least one of authenticated or authorized by the AA service while the one or more wireless links are disconnected, unavailable, or have a transmission quality less than a threshold.

10. The system of any one of the preceding aspects, wherein the on-board access control information is a subset of the master access control information.

11. The system of aspect 10, wherein the subset of the master access control information is based on a list of passengers corresponding to the vehicle, and the computing device corresponds to a particular passenger.

12. The system of any one of the preceding aspects, wherein the computing device is a mobile computing device.

13. The system of any one of the preceding aspects, wherein the client application executing on the mobile computing device enables the mobile computing device to communicate, via the one or more wireless links, with one or more computing devices that are not on-board the vehicle.

14. The system of any one of the preceding aspects, wherein the client application is executed by a virtual machine executing on the computing device.

15. The system of any one of the preceding aspects, wherein the client application is executed by an interpreted scripting executing on the computing device.

16. The system of any one of the preceding aspects, wherein the client application is executed by a rules engine executing on the computing device.

17. The system of any one of the preceding aspects, wherein the synchronization of the on-board access control information with the master access control information is performed periodically.

18. The system of any one of the preceding aspects, wherein the synchronization of the on-board access control information with the master access control information is performed on demand.

19. The system of any one of the preceding aspects, wherein at least one of the respective location of the one or more remote data storage devices or the respective location of the remote provisioning computing device is on the ground or earth.

20. A system, comprising means for storing information indicative of access control of one or more client applications, the information indicative of access control of the one or more client applications being on-board access control information, and the means for storing the on-board access control information being fixedly connected to a vehicle; means for at least one of authenticating or authorizing, based on the on-board access control information, a client application executing on a computing device that is on-board the vehicle; and means for synchronizing, via one or more wireless links, the on-board access control information master access control information that is stored on one or more remote data storage devices and that is provisioned by a remote provisioning computing device, the one or more remote data storage devices and the remote provisioning computing device disposed at respective locations other than at the vehicle.

21. The system of aspect 19, further comprising any one of aspects 1-19.

22. The system of any one of aspects 20-21, wherein the vehicle is an aircraft.

23. The system of the preceding aspect, wherein the aircraft is in-flight.

24. The system of any one of aspects 20-23, wherein at least one of the respective location of the one or more remote data storage devices or the respective location of the remote provisioning computing device is on the ground or earth.

25. The system of any one of aspects 20-24, wherein the one or more wireless links comprise a satellite link.

26. The system of any one of aspects 20-25, wherein the one or more wireless links comprise an air-to-ground link.

27. The system of any one of aspects 20-26, wherein the one or more wireless links comprise an air-to-air link.

28. The system of any one of aspects 20-27, wherein the client application is at least one of authenticated or authorized while the one or more wireless links are unavailable, disconnected, or have a transmission quality less than a threshold.

29. The system of any one of aspects 20-28, wherein the on-board access control information is a subset of the master access control information.

30. The system of the preceding aspect, wherein the subset of the master access control information is determined at least partially based on a list of passengers of or corresponding to the vehicle.

31. The system of the preceding aspect, wherein at least some of the passengers indicated by the list of passengers are on-board the vehicle.

32. The system of any one of aspects 20-31, wherein the computing device is a mobile computing device.

33. The system of any one of aspects 20-32, wherein the mobile computing device is configured to communicate, via the one or more wireless links, with one or more computing devices that are not on-board the vehicle.

34. The system of any one of aspects 20-33, wherein the client application is executed by a virtual machine hosted by the computing device.

35. The system of any one of aspects 20-34, wherein the client application is executed by an interpreted scripting hosted by the computing device.

36. The system of any one of aspects 20-35, wherein the client application is executed by a rules engine hosted by the computing device.

37. A method, comprising: storing, in one or more data storage devices fixedly connected to an aircraft, information indicative of access control corresponding to a plurality of client applications, the information indicative of access control corresponding to the plurality of client applications being on-board access control information; at least one of authenticating or authorizing, based on the on-board access control information, a client application executing on a computing device on-board the aircraft, wherein the computing device is configured to communicate with a ground-based device via one or more wireless communication links; and synchronizing, via the one or more wireless communication links, the on-board access control information with master access control information that is stored in one or more ground-based data storage devices and that is provisioned by a ground-based provisioning computing device.

38. The method of aspect 37, operating in conjunction with any one of aspects 1-36.

39. The method of any one of aspects 37-38, wherein at least a portion of the method is performed by at least a portion of the system of any one of aspects 1-36.

40. The method of any one of aspects 37-39, wherein at least one of authenticating or authorizing the client application comprises at least one of authenticating or authorizing the client application to access, utilize, or consume a service provided on-board the aircraft.

41. The method of any one of aspects 37-40, wherein at least one of authenticating or authorizing the client application is performed while the aircraft is in-flight.

42. The method of any one of aspects 37-41, wherein at least one of authenticating or authorizing the client application is performed while the one or more wireless communication links are unavailable, disconnected, or have a transmission quality less than a threshold.

43. The method of any one of aspects 37-42, wherein synchronizing the on-board access control information with the master access control information is performed while the aircraft is in-flight.

44. The method of any one of aspects 37-43, wherein synchronizing the on-board access control information with the master access control information is performed periodically.

45. The method of any one of aspects 37-44, wherein synchronizing the on-board access control information with the master access control information is performed on demand.

46. The method of any one of aspects 37-45, wherein the computing device is a mobile computing device.

47. The method of any one of aspects 37-46, wherein the method further comprises at least one of authenticating or authorizing the computing device prior to at least one of authenticating or authorizing the client application executing on the computing device.

Thus, many modifications and variations may be made in the techniques and structures described and illustrated herein without departing from the spirit and scope of the present claims. Accordingly, it should be understood that the methods, apparatuses, and systems described herein are illustrative only and are not limiting upon the scope of the claims.

What is claimed is:

1. A system, comprising:
   a plurality of nodes that are on-board a vehicle and that are communicatively connected, each node included in the plurality of nodes having a respective one or more processors;
   one or more data storage devices fixedly connected to the vehicle, the one or more data storage devices storing information indicative of access control corresponding to one or more client applications, the information indicative of access control corresponding to the one or more client applications being on-board access control information; and
   an authorization and authentication (AA) service hosted by a first node of the plurality of nodes and executed by the one or more processors of the first node, the AA service configured to at least one of authenticate or authorize, based on the on-board access control information stored in the one or more data storage devices, a client application to an available service hosted by a second node of the plurality of nodes, the client application executing on a computing device that is on-board the vehicle, and the client application included in the one or more client applications,
   wherein the on-board access control information is synchronized via one or more wireless links to master access control information that is stored in one or more remote data storage devices and that is provisioned by a remote provisioning computing device, the one or more remote data storage devices and the remote provisioning computing device disposed at respective locations other than at the vehicle.

2. The system of claim 1, wherein the vehicle is an aircraft.

3. The system of claim 2, wherein the aircraft is in-flight, and wherein the one or more wireless links include at least one of an air-to-ground link, an air-to-air link, or a satellite link.

4. The system of claim 1, wherein the client application executing on the computing device is at least one of authenticated or authorized by the AA service while the one or more wireless links are disconnected, unavailable, or have a transmission quality less than a threshold.

5. The system of claim 1, wherein the on-board access control information is a subset of the master access control information.

6. The system of claim 5, wherein the subset of the master access control information is based on a list of passengers corresponding to the vehicle, and the computing device corresponds to a particular passenger.

7. The system of claim 1, wherein the computing device is a mobile computing device, and the client application executing on the mobile computing device enables the mobile computing device to communicate, via the one or more wireless links, with one or more computing devices that are not on-board the vehicle.

8. The system of claim 1, wherein the client application is executed by one of a virtual machine, an interpreted scripting, or a rules engine executing on the computing device.

9. The system of claim 1, wherein the synchronization of the on-board access control information and the master access control information is performed at least one of periodically or on-demand.

10. A system, comprising:
one or more data storage devices storing information indicative of access control of one or more client applications, the information indicative of access control of the one or more client applications being on-board access control information, and the one or more storage devices fixedly connected to a vehicle;
a first set of computer executable instructions stored on one or more tangible memories and executable by one or more processors to at least one of authenticate or authorize, based on the on-board access control information, a client application to an available service, the client application executing on a first computing device that is on-board the vehicle, the client application included in the one or more client applications, and the available service executing on a second computing device that is on-board the vehicle; and
a second set of computer executable instructions stored on the one or more tangible memories and executable by the one or more processors to synchronize, via one or more wireless links, the on-board access control information to master access control information that is stored on one or more remote data storage devices and that is provisioned by a remote provisioning computing device, the one or more remote data storage devices and the remote provisioning computing device disposed at respective locations other than at the vehicle.

11. The system of claim 10, wherein the vehicle is an aircraft that is in-flight, the one or more wireless links comprise at least one of a satellite link or an air-to-ground link, and the respective locations of the one or more remote data storage devices and the remote provisioning computing device are on the ground.

12. The system of claim 11, wherein the client application is at least one of authenticated or authorized while the one or more wireless links are unavailable, disconnected, or have a transmission quality less than a threshold.

13. The system of claim 10, wherein the on-board access control information is a subset of the master access control information determined at least partially based on a list of passengers on-board the vehicle.

14. The system of claim 10, wherein the first computing device is a mobile computing device configured to communicate, via the one or more wireless links, with one or more computing devices that are not on-board the vehicle.

15. The system of claim 10, wherein the client application is executed by a virtual machine, an interpreted scripting, or a rules engine hosted by the first computing device.

16. The system of claim 10, wherein the synchronization of the on-board access control information with the master access control information is independent of the at least one of authentication or authorization of the client application.

17. A method, comprising:
storing, in one or more data storage devices fixedly connected to an aircraft, information indicative of access control corresponding to a plurality of client applications, the information indicative of access control corresponding to the plurality of client applications being on-board access control information;
at least one of authenticating or authorizing, via an authorization and authentication (AA) service executed by one or more processors of a first node of a plurality of nodes that are on-board the aircraft and that are communicatively interconnected, and based on the on-board access control information, a client application to an available service executed by one or more processors of a second node of the plurality of nodes, the client application executing on a computing device on-board the aircraft, the client application included in the plurality of client applications, and the computing device configured to communicate with a ground-based device via one or more wireless communication links; and
synchronizing, via the one or more wireless communication links, the on-board access control information with master access control information that is stored in one or more ground-based data storage devices and that is provisioned by a ground-based provisioning computing device.

18. The method of claim 17, wherein at least one of authenticating or authorizing the client application to the available service comprises authorizing the client application to access or consume the available service, and wherein the method is performed while (i) the aircraft is in-flight and (ii) the one or more wireless communication links are unavailable, disconnected, or have a transmission quality less than a threshold.

19. The method of claim 17, wherein the computing device is a mobile computing device, and the method further comprises at least one of authenticating or authorizing the mobile computing device prior to at least one of authenticating or authorizing the client application executing on the mobile computing device.

20. The method of claim 17, wherein synchronizing the on-board access control information and the master access control information is performed at least one of periodically or on-demand while the aircraft is in flight.

* * * * *